United States Patent
Morgan, III et al.

(10) Patent No.: US 10,946,223 B2
(45) Date of Patent: Mar. 16, 2021

(54) FACEMASK NOSECUP RETAINED BY VOICEMITTERS

(71) Applicant: Scott Technologies, Inc., Monroe, NC (US)

(72) Inventors: Judge W. Morgan, III, Oakboro, NC (US); Eric James Bassani, Denver, NC (US); Jeffrey Scott Vogus, Monroe, NC (US); Darin Kyle Thompson, Huntersville, NC (US); Graham Peter Wilson, Flint (GB); Carl Estcourt Tucker, Old Corwyn (GB)

(73) Assignee: Scott Technologies, Inc., Monroe, NC (US)

( * ) Notice: Subject to any disclaimer, the term of this patent is extended or adjusted under 35 U.S.C. 154(b) by 84 days.

(21) Appl. No.: 16/093,362

(22) PCT Filed: Apr. 14, 2017

(86) PCT No.: PCT/US2017/027700
§ 371 (c)(1),
(2) Date: Oct. 12, 2018

(87) PCT Pub. No.: WO2017/181064
PCT Pub. Date: Oct. 19, 2017

(65) Prior Publication Data
US 2019/0209874 A1   Jul. 11, 2019

Related U.S. Application Data

(60) Provisional application No. 62/322,936, filed on Apr. 15, 2016.

(51) Int. Cl.
*A62B 18/02* (2006.01)
*A62B 18/08* (2006.01)
(Continued)

(52) U.S. Cl.
CPC .......... *A62B 18/02* (2013.01); *A41D 13/1161* (2013.01); *A62B 18/08* (2013.01);
(Continued)

(58) Field of Classification Search
CPC ....... A62B 18/00; A62B 18/02; A62B 18/025; A62B 18/04; A62B 18/06; A62B 18/08;
(Continued)

(56) References Cited

U.S. PATENT DOCUMENTS 3,238,535 A    3/1966  Riche
4,595,003 A *  6/1986  Shoemaker ............ A62B 18/02
                                                    128/201.19
(Continued)

FOREIGN PATENT DOCUMENTS

CN         2321479 Y      6/1999
CN         205108058 U    3/2016
(Continued)

OTHER PUBLICATIONS

"Total TPE Solutions—Overmolding Guide", GLS Total TPE Solutions, presented on Dec. 31, 2004, [retrieved from the internet on Dec. 3, 2018], URL <http;//www.polyone.com/files/resources/overmolddesignguide.pdf>, 18 pages.
(Continued)

*Primary Examiner* — Joseph D. Boecker

(57) ABSTRACT

A method and system for personal protective equipment, such as a respirator mask, having a nosecup that is removably coupled to the item of personal protective equipment by at least one of an electronics housing and at least one voicemitter. A respirator mask includes a frame including a voicemitter aperture, a voicemitter, and a nosecup removably coupled to the frame by a rotation of the voicemitter by a predetermined amount to removably lock the nosecup to the frame voicemitter aperture. The mask further includes
(Continued)

electronics components, which are housed in an annular electronics housing located within the front portion of the mask body 14 and in contact with a front portion of the nosecup. The nosecup may further be removably coupled to the mask frame by coupling between the annular electronics housing and the mask frame.

20 Claims, 8 Drawing Sheets

(51) Int. Cl.
    *A41D 13/11* (2006.01)
    *H01M 50/20* (2021.01)
    *A44B 11/00* (2006.01)

(52) U.S. Cl.
    CPC ........... *A62B 18/084* (2013.01); *H01M 50/20* (2021.01); *A44B 11/006* (2013.01); *H01M 2220/30* (2013.01)

(58) Field of Classification Search
    CPC ....... A62B 18/084; A62B 23/02; A62B 17/04; B63C 11/26; B64D 10/00; A42B 3/30; A42B 3/303; A42B 3/306
    See application file for complete search history.

(56) References Cited

U.S. PATENT DOCUMENTS

| | | | |
|---|---|---|---|
| 5,031,237 A | 7/1991 | Honrud | |
| 5,224,473 A * | 7/1993 | Bloomfield | A62B 18/08 128/201.19 |
| 5,934,762 A | 8/1999 | Vrignaud | |
| 6,168,881 B1 | 1/2001 | Fischer | |
| 2002/0069871 A1 * | 6/2002 | Palazzotto | A62B 18/08 128/201.19 |
| 2002/0092522 A1 | 7/2002 | Fabin | |
| 2003/0234018 A1 | 12/2003 | Haston | |
| 2004/0058231 A1 | 3/2004 | Takeshita | |
| 2006/0076012 A1 | 4/2006 | Tanizawa | |
| 2010/0132721 A1 | 6/2010 | Ivory | |
| 2010/0224190 A1 | 9/2010 | Tilley | |
| 2010/0258133 A1 | 10/2010 | Todd | |
| 2012/0125341 A1 | 5/2012 | Gebrewold | |
| 2012/0152253 A1 * | 6/2012 | Leuschner | A62B 18/082 128/204.26 |
| 2013/0087151 A1 | 4/2013 | Klockseth | |
| 2013/0255693 A1 | 10/2013 | Depel | |
| 2015/0034080 A1 * | 2/2015 | Furuichi | A62B 18/02 128/201.19 |
| 2015/0112883 A1 | 4/2015 | Orduna | |
| 2015/0283349 A1 | 10/2015 | McLaren | |
| 2015/0290039 A1 | 10/2015 | McCulloch | |
| 2016/0001111 A1 * | 1/2016 | Morgan | A62B 23/025 128/205.12 |
| 2017/0049978 A1 | 2/2017 | Berg | |
| 2018/0242679 A1 | 8/2018 | Johnstone | |

FOREIGN PATENT DOCUMENTS

| | | | |
|---|---|---|---|
| EP | 2486959 | 8/2012 | |
| EP | 2851832 | 3/2015 | |
| FR | 2695039 A1 * | 3/1994 | ............. H04R 1/46 |
| FR | 2764517 | 12/1998 | |
| WO | WO 2009-067583 | 5/2009 | |
| WO | WO 2011/115754 | 9/2010 | |
| WO | WO 2012-003132 | 1/2012 | |
| WO | WO 2015-084255 | 6/2015 | |
| WO | WO 2015-167098 | 11/2015 | |
| WO | WO 2017-032981 | 3/2017 | |
| WO | WO 2017-180940 | 10/2017 | |
| WO | WO 2017-180951 | 10/2017 | |

OTHER PUBLICATIONS

International Search Report for PCT International Application No. PCT/US2017/027700, dated Oct. 10, 2017, 5 pages.

* cited by examiner

FACEMASK NOSECUP RETAINED BY VOICEMITTERS

CROSS REFERENCE TO RELATED APPLICATIONS

This application is a national stage filing under 35 U.S.C. 371 of PCT/US2017/027700, filed Apr. 14, 2017, which claims the benefit of U.S. Provisional Patent Application No. 62/322,936, filed Apr. 15, 2016, the disclosures of which are incorporated by reference in their entirety herein.

TECHNICAL FIELD

Personal protective equipment, such as a respirator mask, having modular components such as a facemask nosecup that is retained in place by voicemitters.

BACKGROUND

Personal protective equipment masks, such as respirator masks are used in environments where individuals are exposed to hazardous materials, such as gases, vapors, aerosols (e.g., dusts, mists, and/or biological agents), and/or the like. Respirator masks come in a large variety of types and sizes, ranging from cheaper, disposable masks to higher cost, reusable masks that include replaceable filtration cartridges. Most masks include a nosecup that encloses and forms an airtight seal around the user's nose and mouth. The nosecup is connected to a source of breathable air.

The nosecup directs that breathable air to the user while sealing the user's nose and mouth from potentially toxic atmospheric air. Therefore, the nosecup must be accurately sized to the user's face to provide an adequate seal against the user's face. So that one mask may be used by a variety of users, or customized for a particular user, the nosecup may be removable from the mask. This also allows for repair or replacement of a nosecup. However, if the nosecup is removable, it is typically attached to the mask body using bolts or screws, making the task difficult and time-consuming.

Additionally, some nosecups are attached to the mask body by one or more other components, such as voicemitters. For example, if the mask includes a voicemitter for user communication, connection of the voicemitter to the mask body may also serve to connect the nosecup to the mask body. Nosecups may also be attached to the mask body using an annular, or circular, spacer between the front of the nosecup and the front of the mask body. However, similar to the issues with nosecups discussed above, voicemitter and/or the spacer are connected to the mask body using screws, bolts, or the like, which makes it difficult to remove not only the voicemitter and/or spacer, but also the nosecup.

Further, many masks also include electrical components that are housed in one or more portions of the mask body, such as in the areas of the user's cheeks. However, it is often difficult to access all of the electronic components for replacement or repair. Also, housing the electronics components in the mask body adds bulk to the mask and can render the mask unbalanced, thereby leading to discomfort for the user.

SUMMARY

Some embodiments advantageously provide a method and system for an item of personal protective equipment, such as a respirator mask, having a nosecup that is removably coupled to the item of personal protective equipment by at least one of an electronics housing and at least one voicemitter. Further, a voicemitter that is removably coupled to the item of personal protective equipment by rotation of the voicemitter within a portion of the mask frame.

In one embodiment, a respirator mask includes a frame including a frame voicemitter aperture, a voicemitter, and a nosecup removably coupled to the frame by a rotation of the voicemitter by a predetermined amount to removably lock the nosecup to the frame voicemitter aperture.

In one aspect of the embodiment, the voicemitter includes a voicemitter head portion and a voicemitter neck portion, at least a portion of the neck portion being within the frame voicemitter aperture when the nosecup is locked to the frame voicemitter aperture. In one aspect of the embodiment, the nosecup includes a first nosecup stalk and a second nosecup stalk.

In one aspect of the embodiment, the mask further comprises a facepiece having a respirator aperture, the second nosecup stalk being configured to be in fluid communication with the respirator aperture.

In one aspect of the embodiment, the voicemitter head portion is located within the first nosecup stalk.

In one aspect of the embodiment, the first nosecup stalk includes a distal end and a voicemitter aperture at the first nosecup stalk distal end. In one aspect of the embodiment, at least a portion of the voicemitter neck portion extends through the voicemitter aperture of the first nosecup stalk. In one aspect of the embodiment, at least a portion of the voicemitter neck portion is within the frame voicemitter aperture when the mask is assembled.

In one aspect of the embodiment, the nosecup is removably coupled to the mask by a quarter turn of the voicemitter within the frame voicemitter aperture in a first direction, and the nosecup is uncoupled from the mask by a quarter turn of the voicemitter within the frame voicemitter aperture in a second direction opposite the first direction.

In one aspect of the embodiment, the mask further comprises an annular electronics housing.

In one aspect of the embodiment, the annular electronics housing includes an annular electronics housing aperture, the second nosecup stalk extending through the annular electronics housing aperture when the mask is assembled.

In one aspect of the embodiment, the frame further includes a frame respirator receiving portion, the annular electronics housing being rotatably couplable to the frame, the nosecup being further removably coupled to the frame when the annular electronics housing is coupled to the frame.

In one aspect of the embodiment, the second nosecup stalk includes a distal end and a respirator aperture at the second nosecup stalk distal end, the second nosecup stalk further including a flange that at least partially encircles the second nosecup stalk respirator aperture.

In one aspect of the embodiment, the flange has a diameter and the annular electronics housing aperture has an inner diameter, the diameter of the flange being greater than the inner diameter of the annular electronics housing aperture such that the flange retains the annular electronics housing to the second nosecup stalk. In one aspect of the embodiment, the nosecup is removably coupled to the mask by rotation of the voicemitter within the frame voicemitter aperture by the predetermined amount in a first direction, and the nosecup is uncoupled from the mask by rotation of the voicemitter within the frame voicemitter aperture by the predetermined amount in a second direction opposite the first direction, the nosecup being uncoupled from the mask when the annular electronics housing is uncoupled from the frame and the voicemitter is rotated within the frame voicemitter aperture by the predetermined amount in the second direction.

In one aspect of the embodiment, the voicemitter is a first voicemitter on a first side of the mask, the mask further comprising a second voicemitter on a second side of the mask opposite the first side.

In one aspect of the embodiment, the frame voicemitter aperture is a first frame voicemitter aperture and the frame further includes a second frame voicemitter aperture, and: the nosecup includes: a first nosecup stalk; a second nosecup stalk; and a third nosecup stalk; and each of the first voicemitter and the second voicemitter including a voicemitter head portion and a voicemitter neck portion, at least a portion of the neck portion of the first voicemitter being within the first frame voicemitter aperture and at least a portion of the neck portion of the second voicemitter being within the second frame voicemitter aperture when the mask is assembled.

In one aspect of the embodiment, the nosecup is removably coupled to the mask by rotation of the first voicemitter within the first frame voicemitter aperture by the predetermined amount in a first direction and a rotation of the second voicemitter within the second frame voicemitter aperture by the predetermined amount in the first direction, and the nosecup is uncoupled from the mask by rotation of the first voicemitter within the first frame voicemitter aperture by the predetermined amount in a second direction opposite the first direction and of the second voicemitter within the second frame voicemitter aperture by the predetermined amount in the second direction.

In one embodiment, a respirator mask includes: a frame including a first frame voicemitter aperture, a second frame voicemitter aperture, and a semi-circular frame respirator receiving portion between the first and second frame voicemitter apertures; a first voicemitter and a second voicemitter, each of the first and second voicemitters having a head portion and a neck portion; and a nosecup including a first nosecup stalk with a first nosecup voicemitter aperture, a second nosecup stalk with a respirator aperture, and a third nosecup stalk with a second nosecup voicemitter aperture, the head portion of the first voicemitter being within the first nosecup stalk and at least a portion of the neck portion of the first voicemitter extending through the first nosecup voicemitter aperture and the first frame voicemitter aperture, and the head portion of the second voicemitter being within the third nosecup stalk and at least a portion of the neck portion of the second voicemitter extending through the second nosecup voicemitter aperture and the second frame voicemitter aperture, the nosecup being removably coupled to the frame by a rotation of the first voicemitter within the first frame voicemitter aperture by a predetermined amount in a first direction and a rotation of the second voicemitter within the second frame voicemitter aperture by the predetermined amount in the first direction.

In one embodiment, a nosecup for a respirator mask, the nosecup includes: a first nosecup stalk having a first voicemitter aperture; a second nosecup stalk having a respirator aperture; a third nosecup stalk having a second voicemitter aperture, each of the first and third nosecup stalks being configured to receive at least a portion of a voicemitter, the nosecup being configured to be removably coupled to a frame of the mask by a rotation of the first and second voicemitters within the first and third nosecup stalks by a predetermined amount in a first direction and uncoupled from the mask by a rotation of the first and second voicemitters within the first third nosecup stalks by the predetermined amount in a second direction opposite the first direction.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
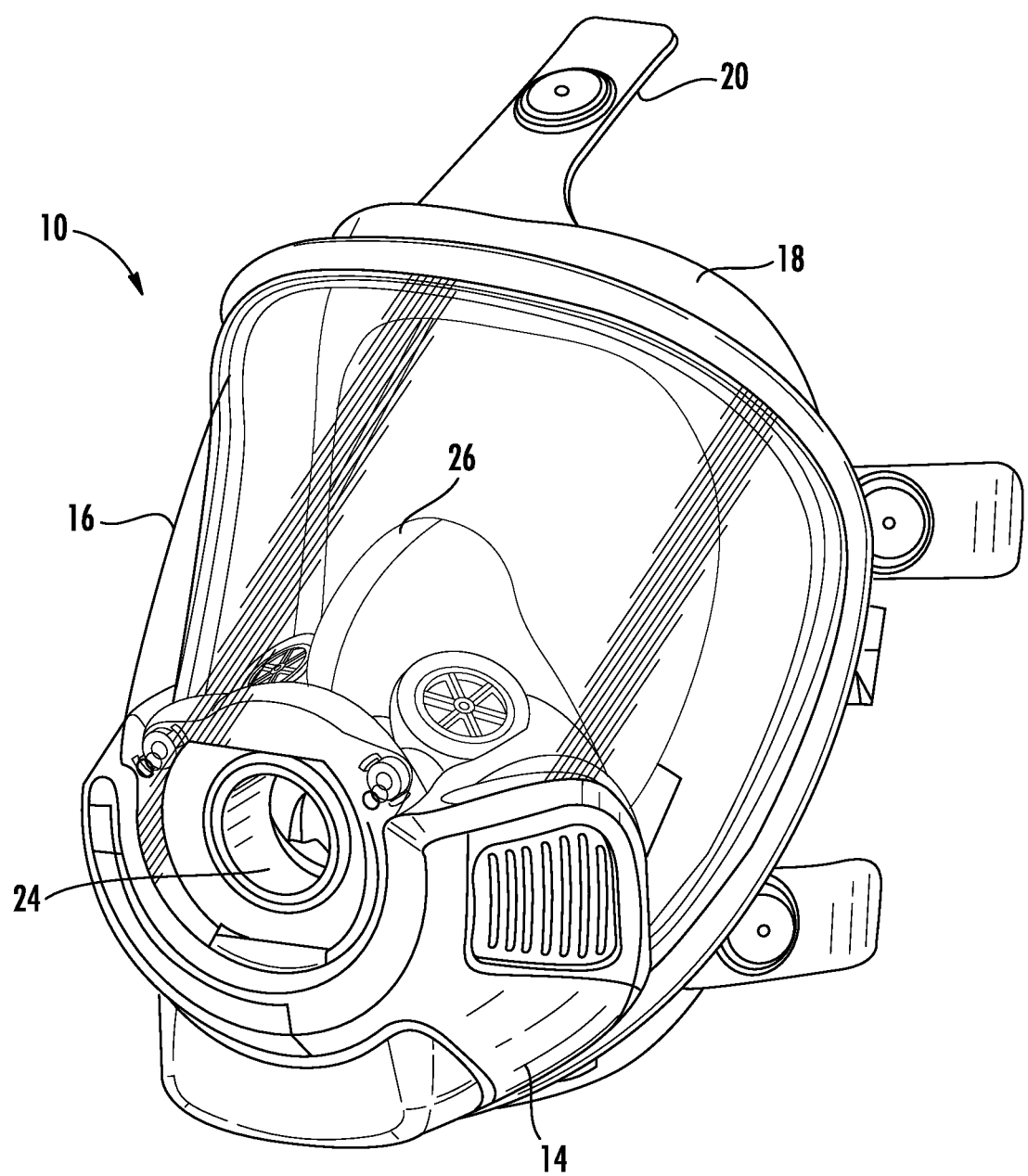
FIG. 1 shows a first front perspective view of an exemplary respirator mask.

The invention advantageously provides a method and system for an item of personal protective equipment, such as a respirator mask, having modular components that are easily coupled and uncoupled. Some embodiments advantageously provide a method and system for a respirator mask, having a nosecup that is removably coupled to the item of personal protective equipment by at least one of an electronics housing and at least one voicemitter. Further, some embodiments advantageously provide a voicemitter that is removably coupled to the item of personal protective equipment by threading or other engagement feature(s). Put another way, the voicemitter 22 is rotatably couplable to the mask body 14. A voicemitter is a type of transmitter that enhances the clarity of the user's voice and improves communication. For example, it includes a membrane that seals the mask but resonates when stimulated by sound waves such has those emanating from a user speaking. This allows the sound to be broadcast out of the mask at a level that can still be heard by a listener in proximity to the user. A nosecup is a flexible component on the inside of the mask that is sized and configured to create a seal around the user's nose and mouth. The nosecup is typically connected to a respirator and directs breathable air to the user.

Before describing in detail exemplary embodiments that are in accordance with the disclosure, it is noted that components have been represented where appropriate by convention symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements, an embodiment of a respirator mask for providing respiratory protection that includes components constructed in accordance with the principles of the invention is shown in the figures and generally designated as "10." Referring to FIG. 1, the mask 10 is a respirator mask configured to be worn by a user in environments where the user is exposed to hazardous materials, such as, but not limited to, gases, vapors, aerosols (such as dusts, mists, and/or biological agents), and/or the like. The mask 10 generally includes a body 14, a facepiece or fenestra 16 coupled to the body 14, a face seal 18 coupled to the body 14 and having one or more straps 20, at least one voicemitter 22 coupled to the body 14 (not shown in FIG. 1), an aperture 24 in the facepiece 16 sized and configured for attachment to a respirator (not shown), a nosecup 26 in communication with the aperture 24, and an annular electronics housing 28. The mask 10 may also include other components, depending on the conditions and purposes for which the mask 10 is used.

In currently known systems, the nosecup 26 is permanently affixed to another mask component, such as the body 14 and/or facepiece 16 or, if the nosecup 26 is removable, removal is difficult and/or involves tools. In the present system, the nosecup 26 is removably coupled to the mask body 14 and/or facepiece 16 in a way that enables the nosecup 26 to be removed from the mask 10 quickly and easily, such as for replacement or repair. In one embodiment, the nosecup 26 is coupled to the mask 10 by at least one of the at least one voicemitter 22 and/or the annular electronics housing 28.

Figure 2:
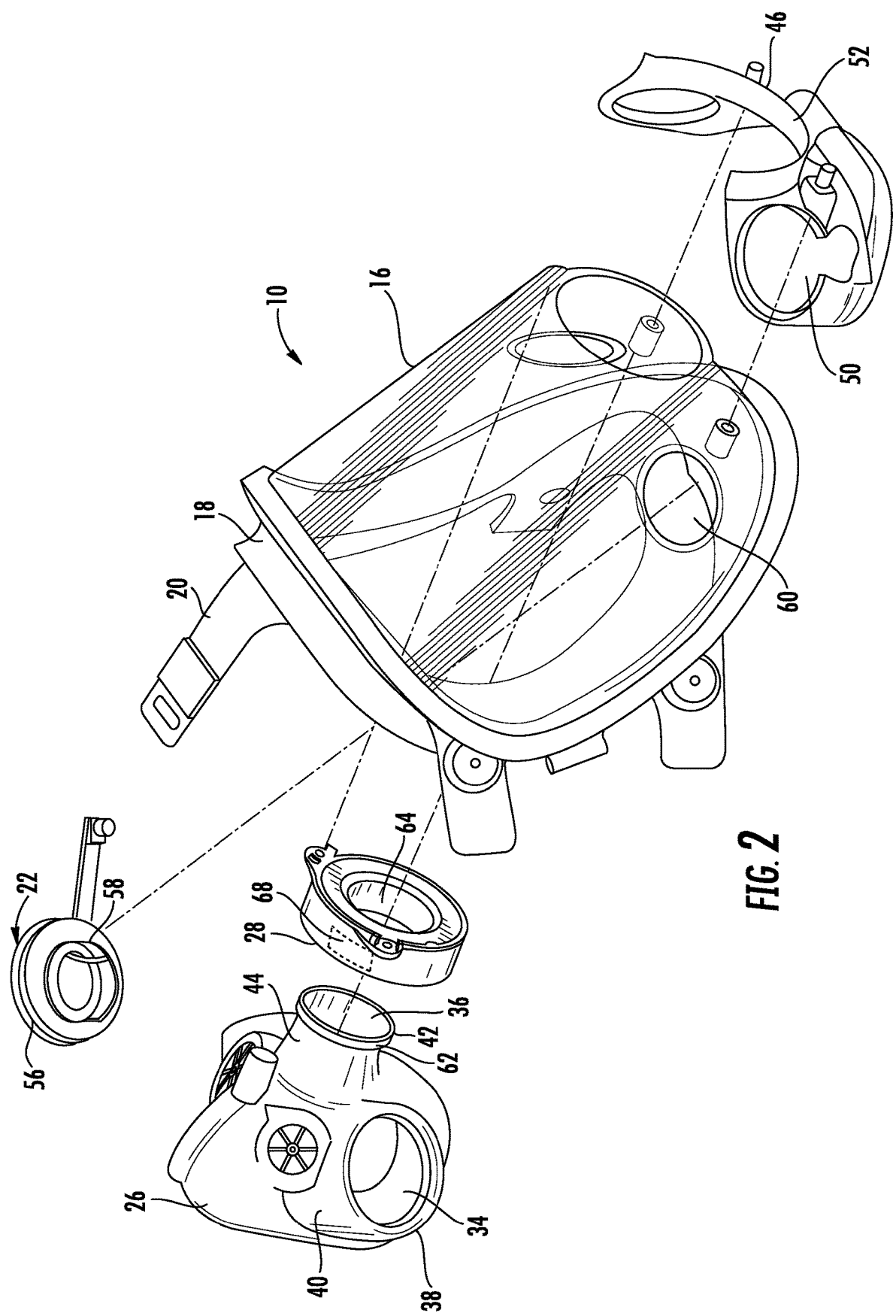
FIG. 2 shows a first exploded view of an exemplary respirator mask including a nosecup, voicemitter, and annular electronics housing.

Referring now to FIG. 2, an exploded view of a respirator mask 10 having a nosecup, annular electronics housing, and voicemitter is shown. The nosecup 26 includes at least one aperture, such as a voicemitter aperture 34 and a respirator aperture 36. In one embodiment, the voicemitter aperture 34 is at a distal end 38 of a first nosecup stalk 40. The first nosecup stalk 40 also includes a proximal end 41 that meets the body of the nosecup 26. Further, the respirator aperture 36 is at the distal end 42 of a second nosecup stalk 44. The second nosecup stalk 44 also includes a proximal end 45 that meets the body of the nosecup 26. The first nosecup stalk 40 is located a predetermined lateral distance from the second nosecup stalk 44. The mask 10 also includes a frame 46 for coupling the nosecup 26, annular electronics housing 28, and voicemitter 22 to the facepiece 16. The frame 46 is located within the body 14 when the mask 10 is assembled, and the frame 46 includes at least one frame voicemitter aperture 50 and a portion for receiving the second nosecup stalk 44. In one embodiment, the frame 46 includes a frame respirator receiving portion 52 that has an at least substantially semi-circular configuration, such that the frame 46 at least partially extends around, or is in contact with at least a portion of, the second nosecup stalk 44.

Figure 3:
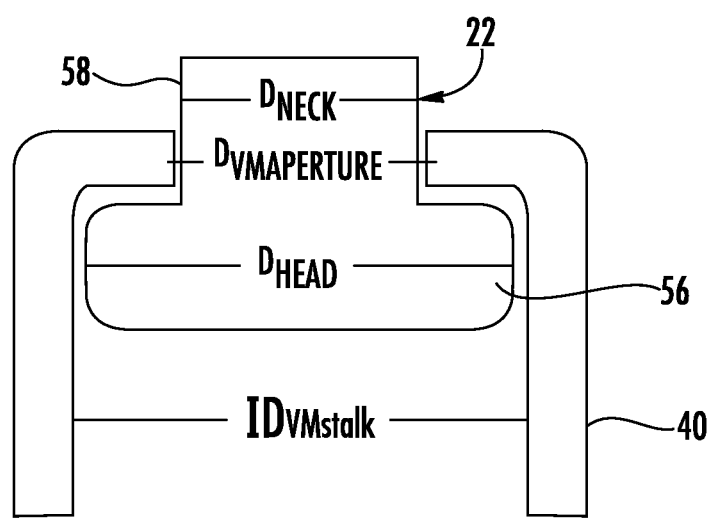
FIG. 3 shows a cross-sectional view of a voicemitter within a portion of a nosecup.

As shown by the dashed connection lines in FIG. 2, when the mask 10 is assembled the first nosecup stalk 40 extends through the frame voicemitter aperture 50 and the second nosecup stalk 44 extends through or is in contact with the semi-circular frame respirator receiving portion 52 of the frame 46. Further, the voicemitter 22 is coupled to the frame 46 and at least partially extends within the frame voicemitter aperture 50. For example, a voicemitter 22 head portion 56 is located within the nosecup first stalk 40 and at least a portion of a voicemitter neck portion 58 extends through a corresponding aperture 60 in the facepiece and extends through or is in contact with the frame voicemitter aperture 50. In this configuration, with the voicemitter head portion 56 directed toward the interior of the mask 10 and the user's mouth, the voicemitter head portion 56 is positioned to effectively receive sound from the user. The first nosecup stalk 40 includes an inner diameter $ID_{VMstalk}$ that is greater than a diameter $D_{VMaperture}$ of the nosecup voicemitter aperture 34, such that the voicemitter 22 can be at least partially located within the first nosecup stalk 40 but cannot pass through the nosecup voicemitter aperture 34. For example, as shown in FIG. 3, the diameter $D_{head}$ of the voicemitter head portion 56 is greater than the diameter $D_{neck}$ of the voicemitter neck portion 58, and the inner diameter $D_{VMstalk}$ of the first nosecup stalk 40 is approximately the same as (or slightly larger than) the diameter $D_{head}$ voicemitter head portion 56 and the diameter $D_{VMaperture}$ of the nosecup voicemitter aperture 34 is approximately the same as (or slightly larger than) the diameter $D_{neck}$ voicemitter neck portion 58 diameter. As is discussed in more detail below, the voicemitter 22 is removably couplable to the frame 46 by rotation of the voicemitter 22 by a predetermined amount. In one embodiment, the voicemitter 22 is removably couplable by a quarter rotation of the voicemitter 22. In other embodiments, the voicemitter 22 is removably couplable to the frame 46 by a less-than-full rotation, such as by an eighth rotation, a third rotation, half rotation, or any other rotation that is less than 360°. In some embodiments, the voicemitter 22 is threaded on its outer surface and screws into the frame 46, the frame 46 having complementary threads to removably engage with the threads on the voicemitter 22. When the nosecup 26 is in place and the voicemitter 22 has been rotated to be coupled to the frame 46, the nosecup 26 is secured to the mask 10.

Additionally, when the mask 10 is assembled, the second nosecup stalk 44 not only extends through or is contact with the semi-circular frame respirator receiving portion 52, but the second stalk 44 also extends through the annular electronics housing 28. The distal end 42 of the second nosecup stalk 44 includes a flange 62 that at least partially encircles the respirator aperture 36 of the second nosecup stalk 44. In some embodiments, the annular electronics housing 28 has a circular cross-sectional shape and an aperture 64 at its center. In some embodiments, the annular electronics housing 28 is flat on the top and/or bottom surfaces, thereby allowing for mating with adjacent flat surfaces of the mask 10. The annular electronics housing also includes, in some embodiments, electrical connectors and/or wires (not shown) to allow for interconnection with other electronic components of the mask 10. The flange 62 has an outer diameter that is greater than the inner diameter of the aperture 64 of the annular electronics housing 28. In some embodiments, the nosecup is composed of a flexible material with a lower durometer than a material(s) from which the annular electronics housing 28 is composed (and from which the frame 46, body 14, voicemitter(s) 22, and/or facepiece 16 is/are composed). For example, the nosecup may be composed of one or more of silicone rubber, thermoplastic elastomer (TPE), rubber (either natural or synthetic), and/or the like, and the annular electronics housing 28 may be composed of a rigid plastic such like high-density polyethylene (HDPE). Therefore, the second nosecup stalk 44 may be deformed and/or compressed to allow the flange 62 to pass through the aperture 64 of the annular electronics housing 28. Once the second nosecup stalk 44 exits the aperture 64, the flange 62 helps lock the annular electronics housing 28 onto the nosecup 26 (or, viewed another way, helps the nosecup 26 remain coupled to the annular electronics housing 28). The annular electronics housing 28 is then coupled to the facepiece 16 and/or to the frame 46, such as with one or more screws, bolts, clasps, or other securing means. Additionally or alternatively, the annular electronics housing 28 may be rotatably couplable to the facepiece 16 and/or to the frame 46, such as by corresponding threading or other engagement feature(s) in the annular electronics housing aperture 64 and the facepiece respirator aperture 24 and/or the frame respirator receiving portion 52. When the annular electronics housing 28 is coupled to the mask 10, the nosecup is also secured to the mask 10. In an alternative embodiment, the annular electronics housing 28 is not coupled to the facepiece 16. Instead, the nosecup 26 is coupled to the mask 10 by the voicemitter 22, insertion of the second nosecup stalk 44 through the annular electronics housing 28 also retaining and supporting the electronics housing 28 within the mask 10. The nosecup 26 and annular electronics housing 28 are further secured by the removable coupling of a respirator to the facepiece 16. When the respirator is coupled to the mask, the respirator is in fluid communication with the second nosecup stalk 44 and, therefore, with the interior of the mask 10.

The annular electronics housing 28 contains various electronics components, such as printed circuit boards, amplifiers, radio frequency components, processors, data storage units, transceivers, wireless communications units, or the like. The annular electronics housing 28 may also contain a power source 68 for providing power to the electronics components. In some embodiments, the annular electronics housing 28 occupies the space within the mask that is usually occupied by a spacer, such as a spacer used to couple the nosecup 26 to the mask body 14. However, including the electronic components in the annular electronics housing 28 efficiently uses mask space, allowing the electronic components to be located in an otherwise wasted or unused space instead of the cheek areas of the mask, or in other areas where the electronic components would add bulk and possibly imbalance to the mask 10.

Figure 4:
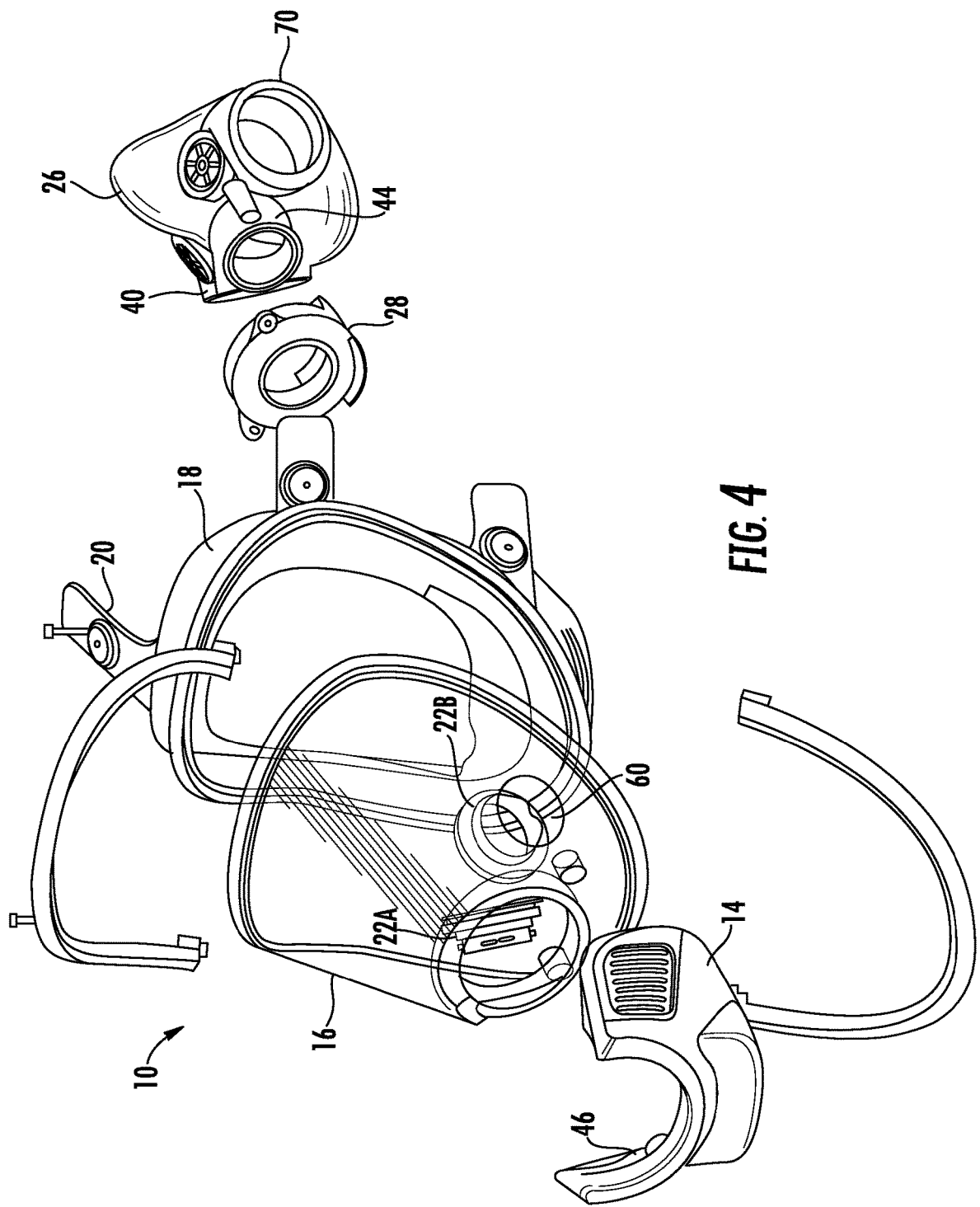
FIG. 4 shows a second exploded view of an exemplary respirator mask including a nosecup, two voicemitters, and an annular electronics housing.
Figure 5:
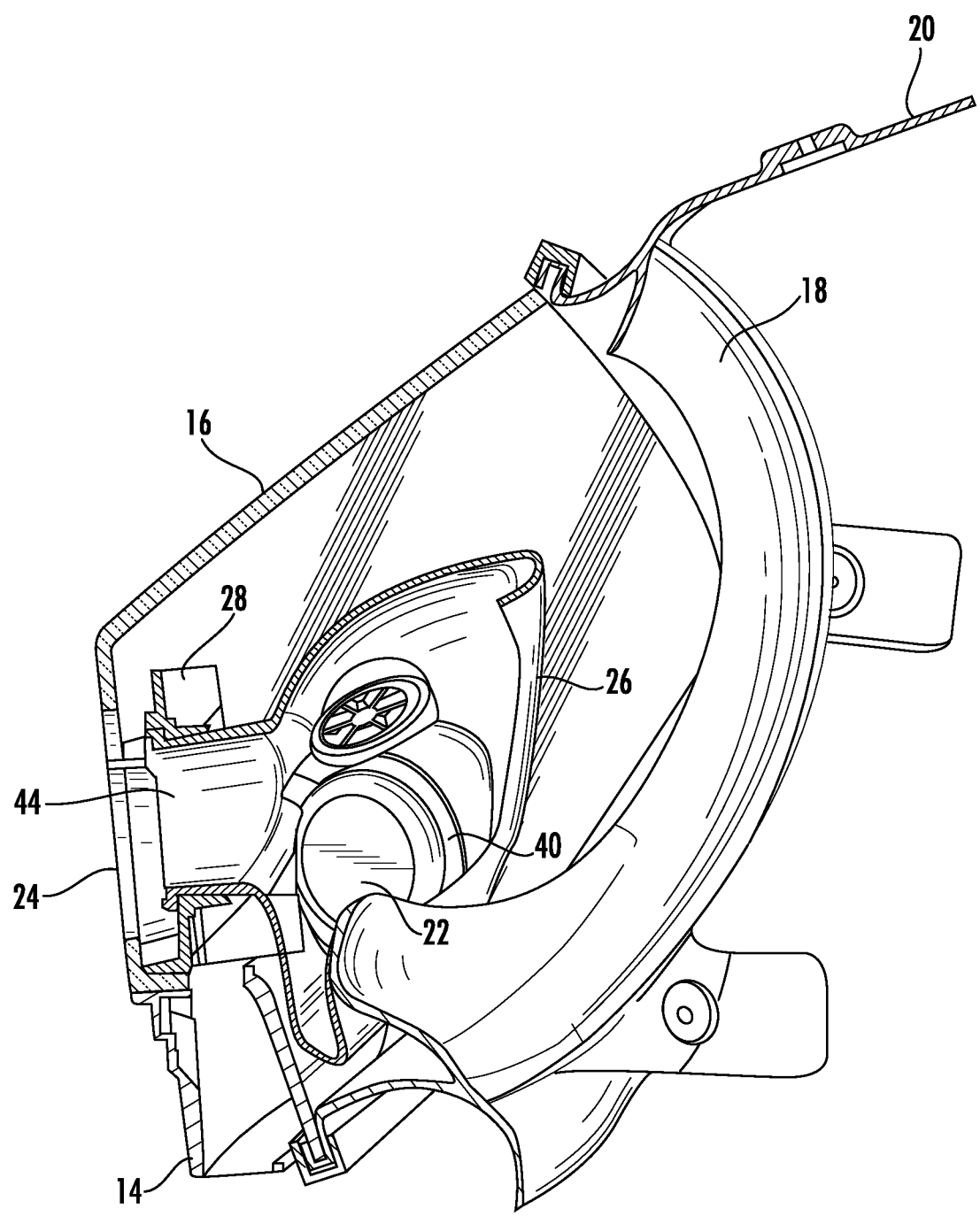
FIG. 5 shows a cross-sectional view of an exemplary respirator mask including a nosecup, voicemitter, and annular electronics housing.

In some embodiments, the nosecup 26 is removably coupled to the mask 10 by the voicemitter(s) 22 only, the annular electronics housing 28 only, or both the voicemitter(s) 22 and the annular electronics housing 28. As is shown in FIG. 4, the frame 46 fits within and is coupled to the body 14 when the mask is assembled. Any components coupled to the frame 46 may also be coupled to the housing 14, or only to the frame 46. A cross-sectional view of the assembled mask 10 is shown in FIG. 5. Although the mask 10 of FIG. 2 is shown and described as having one voicemitter 22, it will be understood that, in some embodiments, the mask 10 optionally includes two voicemitters 22, as shown and described in FIG. 4.

Referring now to FIG. 4, an exploded view of a respirator mask 10 having a nosecup, annular electronics housing, and two voicemitters is shown. The mask 10 of FIG. 4 is substantially the same as the mask 10 shown in FIG. 2, except that it includes a first voicemitter 22A on a first side of the mask and a second voicemitter 22B on a second side of the mask opposite the first side. In this configuration, each voicemitter 22A and 22B (referred to collectively herein as voicemitter 22) is positioned to receive sound from both sides of the user. To accommodate the second voicemitter, the nosecup 26 includes the first nosecup stalk 40 on a first side of the nosecup 26 and also includes a third nosecup stalk 70 on a second side of the nosecup 26 opposite the first side that has a second voicemitter aperture 34B (the voicemitter aperture of the first nosecup stalk 40 being the first voicemitter aperture 34A). Thus, the first nosecup stalk 40 is located a predetermined lateral distance from the second nosecup stalk 44 in a first direction and the third nosecup stalk 70 is located a predetermined lateral distance from the second nosecup stalk 44 in a second direction opposite the first direction. The second nosecup stalk 70 is sized and configured like the first nosecup stalk 40, including having a voicemitter aperture 34. Likewise, the frame 46 includes a first frame voicemitter aperture 50A and a second frame voicemitter aperture 50B (collectively referred to herein as frame voicemitter aperture 50). Each of the first 22A and second 22B voicemitters may be coupled to the mask in the same manner as is shown and described in FIG. 2. Likewise, any features not expressly discussed regarding FIG. 4 will be understood to be the same as those shown and described in FIG. 2.

Figure 6:
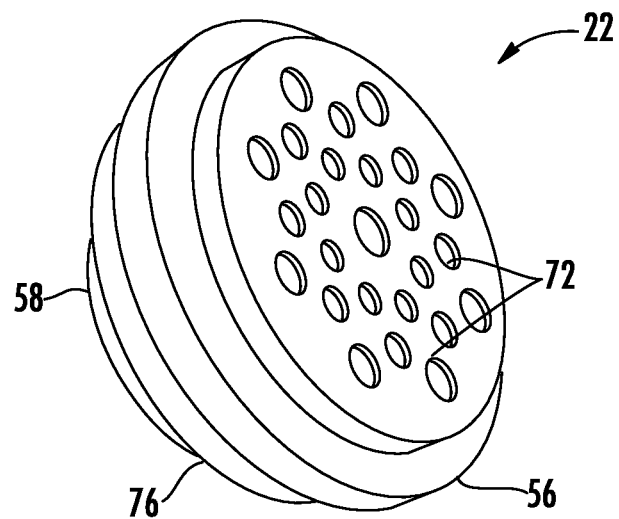
FIG. 6 shows a front perspective view of a voicemitter that is rotatably couplable to a mask body.
Figure 7:
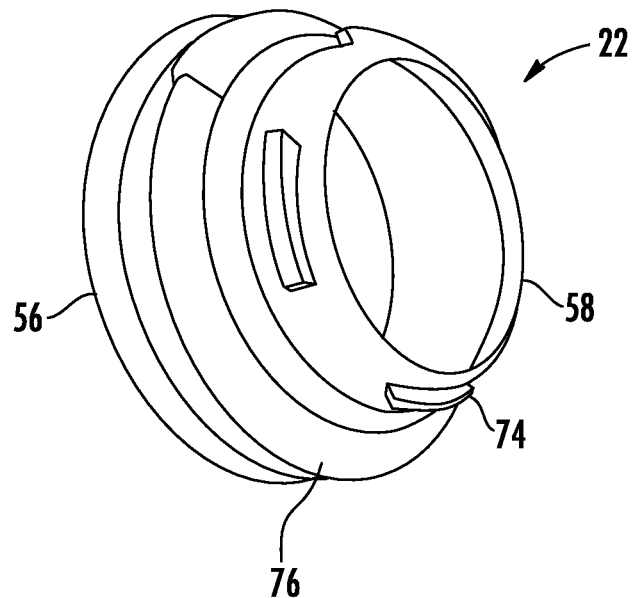
FIG. 7 shows a rear perspective view of the voicemitter that is rotatably couplable to a mask body.
Figure 8:
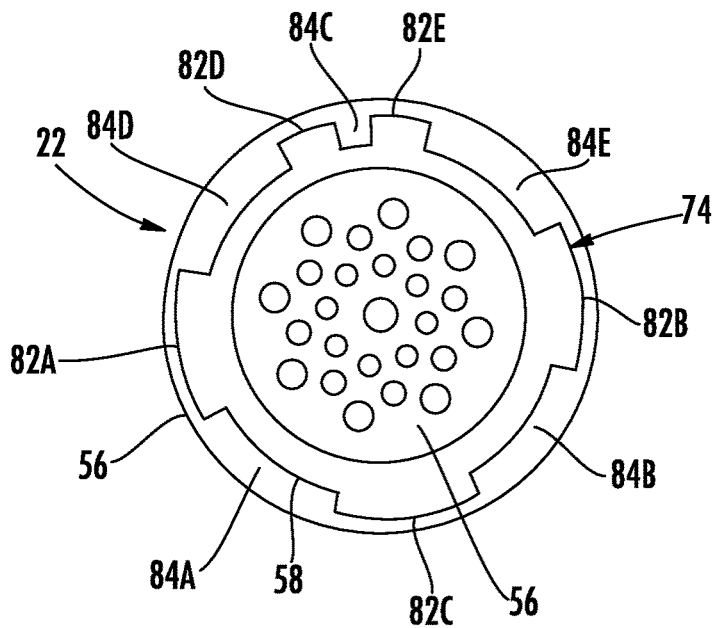
FIG. 8 shows a bottom view of an exemplary voicemitter.

Referring now to FIGS. 6-8, a voicemitter according to the present invention is shown in greater detail. As discussed above, in some embodiments, the voicemitter 22 is configured to be removably coupled to the frame 46 by rotating the voicemitter 22 in a first direction by rotation by a predetermined amount. In one embodiment, the predetermined amount is a quarter rotation (for example, 90°±10°), and the voicemitter 22 is referred to as a quarter-turn voicemitter. The voicemitter 22 includes a head portion 56 having a plurality of apertures 72 and a neck portion 58 having engagement features 74. The voicemitter 22 may also include a gasket 76 around at least a portion of the voicemitter neck portion 58 to provide an airtight seal between the voicemitter 22 and the frame 46 and/or other mask component to which the voicemitter 22 is attached. When the mask 10 is assembled, the neck portion 58 of the voicemitter 22 (or each voicemitter 22A, 22B if the mask includes two voicemitters) extends through the voicemitter aperture 34 of the nosecup 26 and through the frame voicemitter aperture 50. In one embodiment, the neck portion 58 is couplable to the facepiece 16. For example, the facepiece voicemitter aperture 60 may include engagement features 80 that are matable with the engagement features 74 on the voicemitter neck portion 58. In another embodiment, the neck portion 58 is couplable to the frame 46 and/or the body 14. For example, the frame 46, body 14, or both may include engagement features 80 that are matable with the engagement features 74 on the voicemitter neck portion 58, as is described in more detail below. In another embodiment, the neck portion 58 is similarly couplable to both the facepiece 16 and the frame 46 and/or the body 14. The engagement features 74 on the voicemitter neck portion 58, and any corresponding engagement features 80 on the facepiece 16, frame 46, and/or body 14, are configured such that when the voicemitter 22 is positioned in matable contact with the engagement features of the facepiece 16, frame 46, and/or body 14, rotation of the voicemitter 22 by approximately 90° (±10°) couples and secures the voicemitter 22 to the frame 46 and/or other mask component to which the voicemitter 22 is attached (and no further rotation of the voicemitter 22 is possible). Likewise, the same configuration of the engagement features 74 on the voicemitter neck portion 58, and any corresponding engagement features 80 on the facepiece 16, frame 46, and/or body 14, allows the voicemitter 22 to be uncoupled from the mask 10 by a rotation of as little as 90° (±10°) in a second direction opposite the first direction. In one embodiment, the nosecup 26 is coupled to the body 14 by a quarter rotation of the voicemitter 22 within both the frame voicemitter aperture 50 and within the facepiece voicemitter aperture 60. Thus, each of the frame voicemitter aperture 50 and the facepiece voicemitter aperture 60 have complementary engagement features 80 to the engagement features 74 of the voicemitter 22. In another embodiment, the nosecup 26 is coupled to the body 14 by a quarter rotation of the voicemitter 22 within the frame voicemitter aperture 50 to lock the voicemitter 22 to the frame voicemitter aperture 50, the frame voicemitter aperture 50 having complementary engagement features 80 to the engagement features 74 of the voicemitter 22.

In one embodiment, the engagement features 74 on the voicemitter neck portion 58 includes a plurality of protrusions 82 on the circumference on the neck portion 58. Each of the plurality of protrusions 82 extends away from the lateral surface of the voicemitter neck portion 58. In the embodiment shown in FIG. 8, the voicemitter 22 includes a first protrusion 82A, a second protrusion 82B diametrically opposite the first protrusion 82A, and a third protrusion 82C on the circumference of the voicemitter neck portion 58 centered between the first 82A and second 82B protrusions. The first 82A, second 82B, and third 82C protrusions have the same or approximately the same circumferential length. Further, the space 84A between the first 82A and third 82C protrusions, and the space 84B between the second 82B and third 82C protrusions, have the same or approximately the same circumferential length as each of the first 82A, second 82B, and third 82C protrusions. The voicemitter 22 also includes a fourth 82D protrusion and a fifth 82E protrusion, and a space 84C between the fourth 82D and fifth 82E protrusions that are diametrically opposite the third protrusion 82C. The fourth 82D and fifth 82E protrusions, and space 84C therebetween, may have the same or approximately the same circumferential length as one of the protrusions 82A-82C. Additionally, the space 84D between the first protrusion 82A and the fourth protrusion 82D, and the space 84E between the second protrusion 82B and the fifth protrusion 82E, each has a circumferential length that is the same or approximately the same as the circumferential length of each of the spaces 84A and 84B (the spaces between the first 82A, second 82B, and third 82C protrusions), and greater than the circumferential length of the space 84C (the space between the fourth 82D and fifth 82E protrusions). Further, each of the fourth 82D and fifth 82E protrusion has a circumferential length that is less than the circumferential length of each of the first 82A, second 82B, and third 82C protrusions. The protrusions 82A-82E are collectively referred to as voicemitter neck portion protrusions 82. In some embodiments, the protrusions 82 are coplanar (that is, the protrusions 82 lie in a common axial plane).

Figure 9:
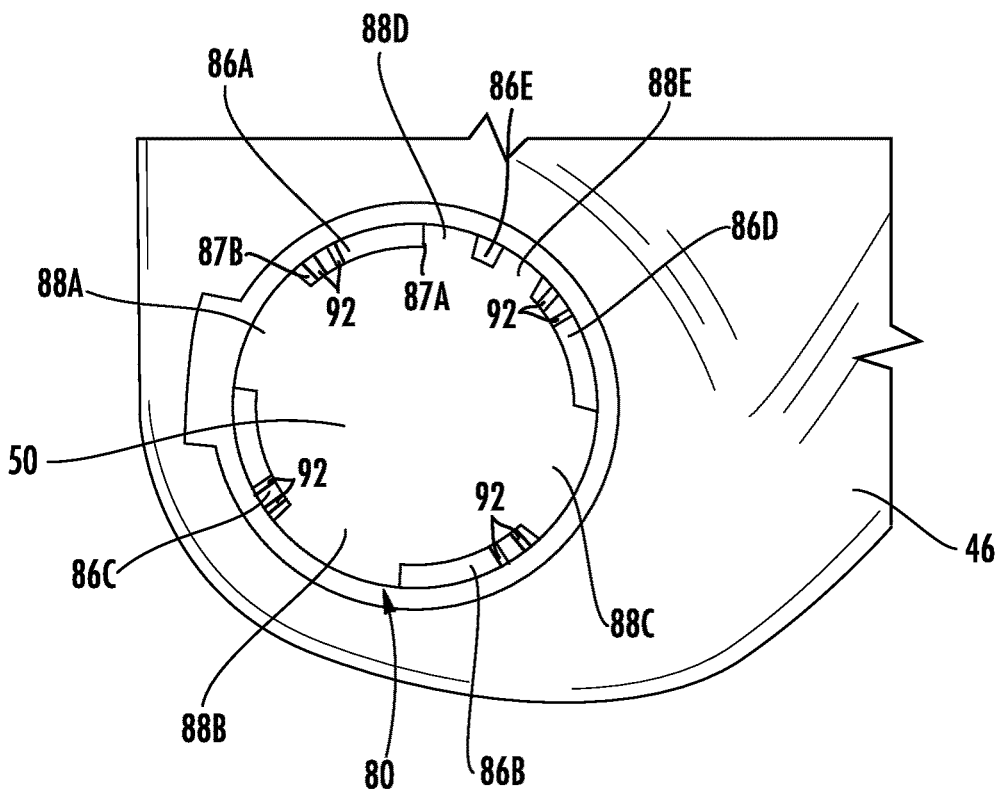
FIG. 9 shows a view of a part of the frame to which a voicemitter may be rotatably coupled.
Figure 10:
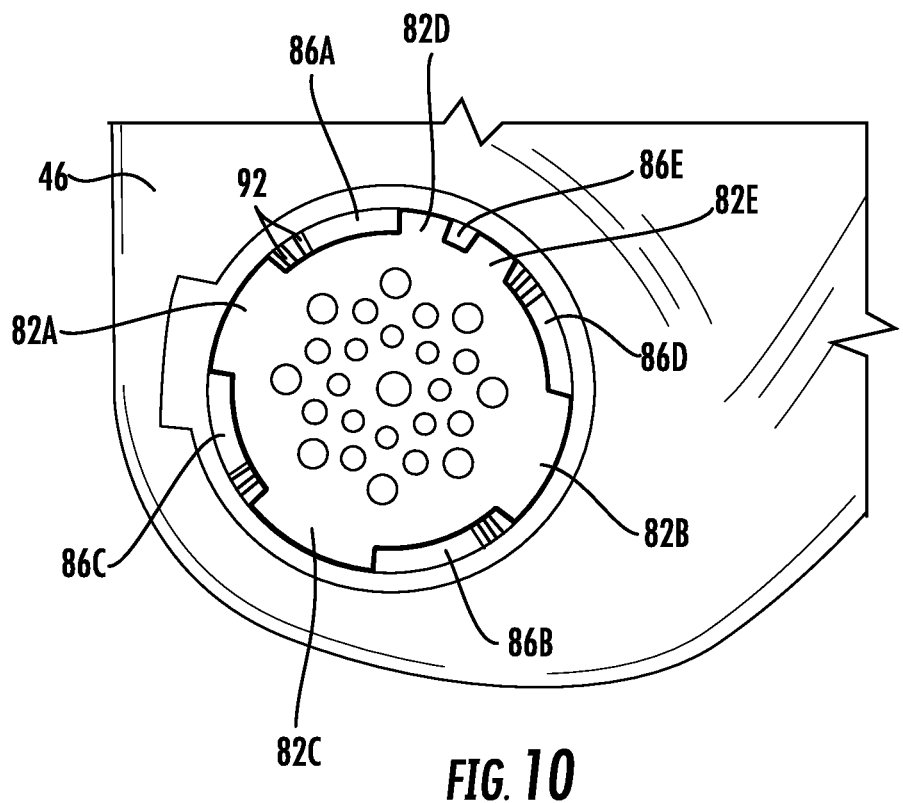
FIG. 10 shows a view of an exemplary coupling between the voicemitter and the frame in which the voicemitter is not locked to the frame.
Figure 11:
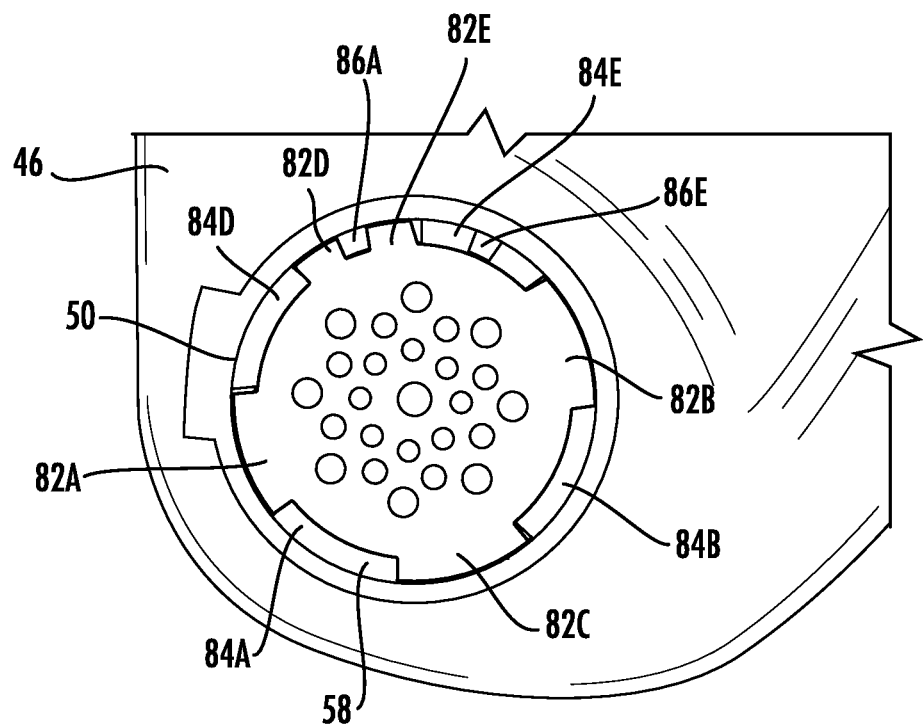
FIG. 11 shows a view of an exemplary coupling between the voicemitter and the frame in which the voicemitter is locked to the frame.

Referring now to FIGS. 9-11, an exemplary coupling between the voicemitter 22 and the frame 46 is shown in more detail. In one embodiment (for example, as shown in FIG. 9), the frame voicemitter aperture 50 includes engagement features 80 that are complementary to the engagement features 74 on the voicemitter 22. In one embodiment, the frame voicemitter aperture 50 includes a plurality of protrusions 86 on the circumference on the frame voicemitter aperture 50. In the embodiment shown in FIG. 9, the frame voicemitter aperture 50 includes a first protrusion 86A, a second protrusion 86B diametrically opposite the first protrusion 86A, a third protrusion 86C on the circumference of the frame voicemitter aperture 50 centered between the first 84A and second 86B protrusions, and a fourth protrusion 86D diametrically opposite the third protrusion 86C. The first 86A, second 86B, third 86C, and fourth 86D protrusions have the same or approximately the same circumferential length. Further, the space 88A between the first 86A and third 86C protrusions, the space 88B between the second 86B and third 86C protrusions, and the space 88C between the second 86B and fourth 86D protrusions have the same or approximately the same circumferential length as each of the first 86A, second 86B, third 86C, and fourth 86D protrusions. The frame voicemitter aperture 50 also includes a fifth 86E protrusion between the first 86A and fourth 86D protrusions. The fifth protrusion 86E is diametrically opposite the space 88B between the second 86B and third 86C protrusions. The fifth 86E protrusion, and the spaces between the fifth protrusion 84E and each of the first 86A and fourth 86D protrusions (88D and 88E, respectively), have the same or approximately the same circumferential length as one of the protrusions 86A-86D. The protrusions 86A-86E are collectively referred to as frame voicemitter aperture protrusions 86. In some embodiments, each of the plurality of protrusions 86 is coplanar with the surface of the frame 46 in which the frame voicemitter aperture 50 lies. In other embodiments, the first 86A, second 86B, third 86C, and fourth 86D protrusions may each have a ramped configuration. For example, each of the first 86A, second 86B, third 86C, and fourth 86D protrusions may have a first end 87A and a second end 87B, with the first end 87A being closer to the voicemitter neck portion protrusions 82 when the voicemitter 22 is inserted into the frame voicemitter aperture 50. In one embodiment, the second end 87B of the protrusions are ramped or canted toward the voicemitter neck portion protrusions 82 by approximately 5° (±2°). Further, each of the first 86A, second 86B, third 86C, and fourth 86D protrusions may have at least one rotational stop feature 92 on the second end 87B. Although not shows, the voicemitter neck portion protrusions 82 may also include at least one corresponding stop feature. As is described in more detail below, this configuration of the frame voicemitter aperture protrusions 86 helps keep the voicemitter 22 locked to the frame 46.

FIG. 10 shows the voicemitter neck portion 58 positioned within the frame voicemitter aperture 50 such that the voicemitter 22 could be removed from the frame voicemitter aperture 50 without further rotation of the voicemitter 22.

This may be referred to as the release position. When in the release position, the voicemitter neck portion protrusions 82 are aligned with the frame voicemitter aperture protrusion spaces 88. In one embodiment, protrusion 82A is aligned with space 88A, protrusion 82B is aligned with space 88C, protrusion 82C is aligned with space 88B, protrusion 82D is aligned with space 88D, and protrusion 82E is aligned with space 88E. Likewise, protrusion 86A is aligned with space 84D, protrusion 86B is aligned with space 84B, protrusion 86C is aligned with space 84A, protrusion 86D is aligned with space 84E, and protrusion 86E is aligned with space 84C.

FIG. 11 shows the voicemitter neck portion 58 positioned within the frame voicemitter aperture 50 such that the voicemitter 22 is locked onto the frame 46 by the configuration of protrusions 82, 86 and spaces 84, 88 of the voicemitter 22 and frame voicemitter aperture 50. This may be referred to as the locked position. When in the release position, the voicemitter neck portion threading 74 is extended through the frame voicemitter aperture 50 so that subsequent rotation of the voicemitter 22 positions the protrusions 82 of the voicemitter on top of the protrusions 86 of the frame voicemitter aperture 50 (for example, as shown in FIG. 10). Further, in one embodiment, the ramped configuration of the frame voicemitter aperture protrusions 86 causes the voicemitter 22 to draw closer to, or tighten against, the frame 46 as the voicemitter 22 is rotated. Additionally, the at least one stop feature of the voicemitter neck portion protrusions 82 pass over are secured by the at least one rotational stop feature 92 of the frame voicemitter aperture protrusions 86. In one embodiment, each of the first 86A, second 86B, third 86C, and fourth 86D frame voicemitter aperture protrusions includes two rotational stop features 92, and each of the first 82A, second 82B, and third 82C voicemitter neck portion protrusions includes one rotational stop feature. When the voicemitter 22 is in the locked position, the rotational stop feature of each voicemitter neck portion protrusion 82 is retained between the two rotational stop features 92 of the frame voicemitter aperture protrusions 86. This configuration prevents the voicemitter 22 from being disengaged from the frame 46. In one embodiment, the protrusions 82, 86 are aligned and overlapping when the voicemitter 22 is rotated by an eighth rotation (that is, by rotation of 45°). However, the configuration of the protrusions 82, 86 allows the voicemitter 22 to be coupled to the frame 46 by a rotation of less than or more than an eighth rotation (for example, 45°±15°). Further, the voicemitter 22 may pass from the release position to the locked position every eighth rotation.

However, it will be understood that the voicemitter neck portion protrusions 82 and the frame voicemitter aperture protrusions 86 may be of any number and configuration that allows the voicemitter 22 to be quickly and easily coupled to the frame 46. In one embodiment, the voicemitter neck portion 58 and the frame voicemitter aperture 50 include complementing protrusions 82, 86 that allow the voicemitter 22 to be coupled to the frame 46 by a quarter rotation (that is, rotation of approximately 90°±15°) of the voicemitter neck portion 58 within the frame voicemitter aperture 50.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In one embodiment, a respirator mask 10 includes a frame 46 including a frame voicemitter aperture 50, a voicemitter 22, and a nosecup 26 removably coupled to the frame 46 by a rotation of the voicemitter 22 by a predetermined amount to removably lock the nosecup 26 to the frame voicemitter aperture 50.

In one aspect of the embodiment, the voicemitter 22 includes a voicemitter head portion 56 and a voicemitter neck portion 58, at least a portion of the neck portion 58 being within the frame voicemitter aperture 50 when the nosecup 26 is locked to the frame voicemitter aperture 50. In one aspect of the embodiment, the nosecup 26 includes a first nosecup stalk 40 and a second nosecup stalk 44.

In one aspect of the embodiment, the mask 10 further comprises a facepiece 16 having a respirator aperture 24, the second nosecup stalk 44 being configured to be in fluid communication with the respirator aperture 24.

In one aspect of the embodiment, the voicemitter head portion 56 is located within the first nosecup stalk 40.

In one aspect of the embodiment, the first nosecup stalk 40 includes a distal end 38 and a voicemitter aperture 34 at the first nosecup stalk distal end 38. In one aspect of the embodiment, at least a portion of the voicemitter neck portion 58 extends through the voicemitter aperture 34 of the first nosecup stalk 40. In one aspect of the embodiment, at least a portion of the voicemitter neck portion 58 is within the frame voicemitter aperture 50 when the mask 10 is assembled.

In one aspect of the embodiment, the nosecup 26 is removably coupled to the mask 10 by a quarter turn of the voicemitter 22 within the frame voicemitter aperture 50 in a first direction, and the nosecup 26 is uncoupled from the mask 10 by a quarter turn of the voicemitter 22 within the frame voicemitter aperture 50 in a second direction opposite the first direction.

In one aspect of the embodiment, the mask 10 further comprises an annular electronics housing 28.

In one aspect of the embodiment, the annular electronics housing 28 includes an annular electronics housing aperture 64, the second nosecup stalk 44 extending through the annular electronics housing aperture 64 when the mask 10 is assembled.

In one aspect of the embodiment, the frame 46 further includes a frame respirator receiving portion 52, the annular electronics housing 28 being rotatably couplable to the frame 46, the nosecup 26 being further removably coupled to the frame 46 when the annular electronics housing 28 is coupled to the frame 46.

In one aspect of the embodiment, the second nosecup stalk 44 includes a distal end 42 and a respirator aperture 36 at the second nosecup stalk distal end 42, the second nosecup stalk 44 further including a flange 62 that at least partially encircles the second nosecup stalk respirator aperture 36.

In one aspect of the embodiment, the flange 62 has a diameter and the annular electronics housing aperture 64 has an inner diameter, the diameter of the flange 62 being greater than the inner diameter of the annular electronics housing aperture 64 such that the flange 62 retains the annular electronics housing 28 to the second nosecup stalk 44. In one aspect of the embodiment, the nosecup 26 is removably coupled to the mask 10 by rotation of the voicemitter 22 within the frame voicemitter aperture 50 by the predetermined amount in a first direction, and the nosecup 26 is uncoupled from the mask 10 by rotation of the voicemitter 22 within the frame voicemitter aperture 50 by the predetermined amount in a second direction opposite the first direction, the nosecup 26 being uncoupled from the mask 10 when the annular electronics housing 28 is uncoupled from the frame 46 and the voicemitter 22 is rotated within the frame voicemitter aperture 50 by the predetermined amount in the second direction.

In one aspect of the embodiment, the voicemitter 22 is a first voicemitter 22A on a first side of the mask 10, the mask further comprising a second voicemitter 22B on a second side of the mask 10 opposite the first side.

In one aspect of the embodiment, the frame voicemitter aperture 50A is a first frame voicemitter aperture 50A and the frame further includes a second frame voicemitter aperture 50B, and: the nosecup 26 includes: a first nosecup stalk 40; a second nosecup stalk 44; and a third nosecup stalk 70; and each of the first voicemitter 22A and the second voicemitter 22B including a voicemitter head portion 56 and a voicemitter neck portion 58, at least a portion of the neck portion 58 of the first voicemitter 22A being within the first frame voicemitter aperture 50A and at least a portion of the neck portion 58 of the second voicemitter 22B being within the second frame voicemitter aperture 50B when the mask 10 is assembled.

In one aspect of the embodiment, the nosecup 26 is removably coupled to the mask 10 by rotation of the first voicemitter 22A within the first frame voicemitter aperture 50A by the predetermined amount in a first direction and a rotation of the second voicemitter 22B within the second frame voicemitter aperture 50B by the predetermined amount in the first direction, and the nosecup 26 is uncoupled from the mask 10 by rotation of the first voicemitter 22A within the first frame voicemitter aperture 50A by the predetermined amount in a second direction opposite the first direction and of the second voicemitter 22B within the second frame voicemitter aperture 50B by the predetermined amount in the second direction.

In one embodiment, a respirator mask 10 includes: a frame 46 including a first frame voicemitter aperture 50A, a second frame voicemitter aperture 50B, and a semi-circular frame respirator receiving portion 52 between the first 50A and second 50B frame voicemitter apertures; a first voicemitter 22A and a second voicemitter 22B, each of the first 22A and second 22B voicemitters having a head portion 56 and a neck portion 58; and a nosecup 26 including a first nosecup stalk 40 with a first nosecup voicemitter aperture 34A, a second nosecup stalk 44 with a respirator aperture 36, and a third nosecup stalk 70 with a second nosecup voicemitter aperture 34B, the head portion 56 of the first voicemitter 22A being within the first nosecup stalk 40 and at least a portion of the neck portion 58 of the first voicemitter 22A extending through the first nosecup voicemitter aperture 34A and the first frame voicemitter aperture 50A, and the head portion 56 of the second voicemitter 22B being within the third nosecup stalk 70 and at least a portion of the neck portion 58 of the second voicemitter 22B extending through the second nosecup voicemitter aperture 34B and the second frame voicemitter aperture 50B, the nosecup 26 being removably coupled to the frame 46 by a rotation of the first voicemitter 22A within the first frame voicemitter aperture 50A by a predetermined amount in a first direction and a rotation of the second voicemitter 22B within the second frame voicemitter aperture 50B by the predetermined amount in the first direction.

In one embodiment, a nosecup 26 for a respirator mask 10, the nosecup 26 includes: a first nosecup stalk 40 having a first voicemitter aperture 34A; a second nosecup stalk 44 having a respirator aperture 36; a third nosecup stalk 70 having a second voicemitter aperture 34B, each of the first 40 and third 70 nosecup stalks being configured to receive at least a portion of a voicemitter 22A, 22B, the nosecup 26 being configured to be removably coupled to a frame 46 of the mask 10 by a rotation of the first 22A and second 22B voicemitters within the first 40 and third 70 nosecup stalks by a predetermined amount in a first direction and uncoupled from the mask 10 by a rotation of the first 22A and second 22B voicemitters within the first 40 third 70 nosecup stalks by the predetermined amount in a second direction opposite the first direction.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A respirator mask comprising:
a frame including a frame voicemitter aperture;
a voicemitter; and
a nosecup removably coupled to the frame by a rotation of the voicemitter by a predetermined amount to removably lock the nosecup to the frame voicemitter aperture.

2. The respirator mask of claim 1, wherein the voicemitter includes a voicemitter head portion and a voicemitter neck portion, at least a portion of the neck portion being within the frame voicemitter aperture when the nosecup is locked to the frame voicemitter aperture.

3. The respirator mask of claim 2, wherein the nosecup includes a first nosecup stalk and a second nosecup stalk.

4. The respirator mask of claim 3, wherein the mask further comprises a facepiece having a respirator aperture, the second nosecup stalk being configured to be in fluid communication with the respirator aperture.

5. The respirator mask of claim 3, wherein the voicemitter head portion is located within the first nosecup stalk.

6. The respirator mask of claim 5, wherein the first nosecup stalk includes a distal end and a voicemitter aperture at the first nosecup stalk distal end.

7. The respirator mask of claim 6, wherein at least a portion of the voicemitter neck portion extends through the voicemitter aperture of the first nosecup stalk.

8. The respirator mask of claim 7, wherein at least a portion of the voicemitter neck portion is within the frame voicemitter aperture when the mask is assembled.

9. The respirator mask of claim 8, wherein the nosecup is removably coupled to the mask by a quarter turn of the voicemitter within the frame voicemitter aperture in a first direction, and the nosecup is uncoupled from the mask by a quarter turn of the voicemitter within the frame voicemitter aperture in a second direction opposite the first direction.

10. The respirator mask of claim 1, wherein the mask further comprises an annular electronics housing.

11. The respirator mask of claim 10, wherein the annular electronics housing includes an annular electronics housing aperture, the second nosecup stalk extending through the annular electronics housing aperture when the mask is assembled.

12. The respirator mask of claim 11, wherein the frame further includes a frame respirator receiving portion, the annular electronics housing being rotatably couplable to the frame, the nosecup being further removably coupled to the frame when the annular electronics housing is coupled to the frame.

13. The respirator mask of claim 11, wherein the second nosecup stalk includes a distal end and a respirator aperture at the second nosecup stalk distal end, the second nosecup stalk further including a flange that at least partially encircles the second nosecup stalk respirator aperture.

14. The respirator mask of claim 13, wherein the flange has a diameter and the annular electronics housing aperture has an inner diameter, the diameter of the flange being greater than the inner diameter of the annular electronics housing aperture such that the flange retains the annular electronics housing to the second nosecup stalk.

15. The respirator mask of claim 14, wherein the nosecup is removably coupled to the mask by rotation of the voicemitter within the frame voicemitter aperture by the predetermined amount in a first direction, and the nosecup is uncoupled from the mask by rotation of the voicemitter within the frame voicemitter aperture by the predetermined amount in a second direction opposite the first direction, the nosecup being uncoupled from the mask when the annular electronics housing is uncoupled from the frame and the voicemitter is rotated within the frame voicemitter aperture by the predetermined amount in the second direction.

16. The respirator mask of claim 1, wherein the voicemitter is a first voicemitter on a first side of the mask, the mask further comprising a second voicemitter on a second side of the mask opposite the first side.

17. The respirator mask of claim 16, wherein the frame voicemitter aperture is a first frame voicemitter aperture and the frame further includes a second frame voicemitter aperture, and:
  the nosecup includes:
    a first nosecup stalk;
    a second nosecup stalk; and
    a third nosecup stalk; and
    each of the first voicemitter and the second voicemitter including a voicemitter head portion and a voicemitter neck portion, at least a portion of the neck portion of the first voicemitter being within the first frame voicemitter aperture and at least a portion of the neck portion of the second voicemitter being within the second frame voicemitter aperture when the mask is assembled.

18. The respirator mask of claim 17, wherein the nosecup is removably coupled to the mask by rotation of the first voicemitter within the first frame voicemitter aperture by the predetermined amount in a first direction and a rotation of the second voicemitter within the second frame voicemitter aperture by the predetermined amount in the first direction, and the nosecup is uncoupled from the mask by rotation of the first voicemitter within the first frame voicemitter aperture by the predetermined amount in a second direction opposite the first direction and of the second voicemitter within the second frame voicemitter aperture by the predetermined amount in the second direction.

19. A respirator mask, comprising:
  a frame including a first frame voicemitter aperture, a second frame voicemitter aperture, and a semi-circular frame respirator receiving portion between the first and second frame voicemitter apertures;
  a first voicemitter and a second voicemitter, each of the first and second voicemitters having a head portion and a neck portion; and
  a nosecup including a first nosecup stalk with a first nosecup voicemitter aperture, a second nosecup stalk with a respirator aperture, and a third nosecup stalk with a second nosecup voicemitter aperture,
  the head portion of the first voicemitter being within the first nosecup stalk and at least a portion of the neck portion of the first voicemitter extending through the first nosecup voicemitter aperture and the first frame voicemitter aperture, and the head portion of the second voicemitter being within the third nosecup stalk and at least a portion of the neck portion of the second voicemitter) extending through the second nosecup voicemitter aperture and the second frame voicemitter aperture,
  the nosecup being removably coupled to the frame by a rotation of the first voicemitter within the first frame voicemitter aperture by a predetermined amount in a first direction and a rotation of the second voicemitter within the second frame voicemitter aperture by the predetermined amount in the first direction.

20. A nosecup for a respirator mask, the nosecup comprising:
  a first nosecup stalk having a first voicemitter aperture;
  a second nosecup stalk having a respirator aperture;
  a third nosecup stalk having a second voicemitter aperture, each of the first and third nosecup stalks being configured to receive at least a portion of a voicemitter, the nosecup being configured to be removably coupled to a frame of the mask by a rotation of the first and second voicemitters within the first and third nosecup stalks by a predetermined amount in a first direction and uncoupled from the mask by a rotation of the first and second voicemitters within the first and third nosecup stalks by the predetermined amount in a second direction opposite the first direction.

* * * * *